B. B. Hill.
Hand Stamp.
No. 2,836. Reissued Jan. 14, 1868.
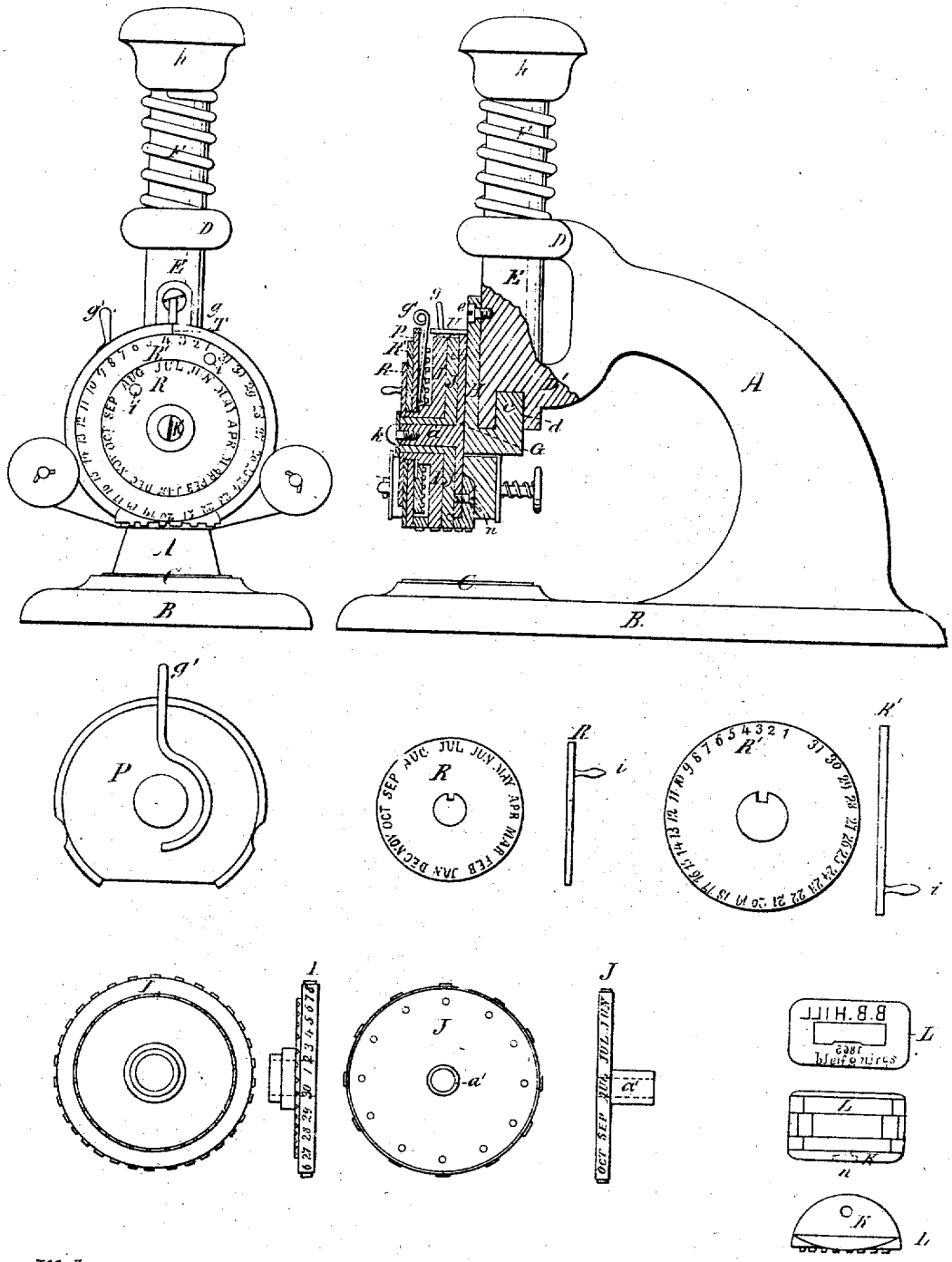
Witnesses
N. C. Welder
Jeremy W. Bays
Inventor:
B. B. Hill

United States Patent Office.

B. B. HILL, OF CHICOPEE, MASSACHUSETTS.

*Letters Patent No.* 59,395, *dated November* 6, 1866; *reissue No.* 2,836, *dated January* 14, 1868.

IMPROVEMENT IN HAND-STAMPS.

The Schedule referred to in these Letters Patent and making part of the same.

TO ALL WHOM IT MAY CONCERN:

Be it known that I, B. B. HILL, of Chicopee, county of Hampden, and State of Massachusetts, have invented certain new and useful Improvements in "Hand-Stamp" and Calendar combined; and to enable others skilled to make and use, I will proceed to describe by referring to the drawings, in which the same letters indicate like parts in each of the figures.

The object desired to be attained thereby is to produce a hand-stamp and calendar combined for stamping papers, and a counting-room calendar, susceptible of periodical changes, not liable to get out of order, cheap, and simple of construction. In the accompanying drawings—

Figure 1 is a side elevation, partly in section, showing the arrangement of the mechanism.

Figure 2 is a front elevation showing the dial-plates, upon which are affixed characters which represent periods of time.

A is the stock. B is the bed-plate of the stock. C is the bed-plate, upon which the paper or other material is laid to be stamped. D are fork projections, which extend forward from the upper end of said stock. These projections are provided with sockets or bearings, in which the operating-spindle is fitted, so as to work closely and freely therein, to actuate the stamp. The lower projection or socket D′ has a slit cut perpendicularly through its front edge, the object of which is to serve as a guide-way for the bracket made on or secured to the back side of the wheel-case, to hold it in a true position with the stock A. E is a plunger-spindle, having a pad, *h*, made on or secured to its upper end. This spindle, if desirable, may be made of hollow tubing or of metal rod. A spiral spring, F, or its equivalent, is secured or arranged in or upon the spindle E, one end of which takes its bearing against the under side of the pad *h*, and the other end takes its bearing against the projection D, or a protuberance therefrom. The office of said spring is to react the spindle upward to its resting-place after it has been pressed down to perform its required execution upon the bed C. It will be clearly seen that, when desired, this spindle E may be made of tubing or hollow metal, and that said spring may be arranged on the inside of said spindle, one end of which taking its bearing against the under side of the pad *h*, and the other end thereof taking its bearing upon a protuberance from the inside of the bearings or projections D, said spindle being provided with a slit to allow it to work freely up and down over said pin or protuberance. Said pin or protuberance may serve the double purpose of a support for the lower end of the spring, and also to prevent the spindle from turning from right to left. G is a wheel and ribbon-case. This wheel and ribbon-case, with its axis-pin, *a*, (upon which the wheels are arranged and turn,) with the ribbon-cases, are made of one piece of metal, open wholly, and only, from one side, (the face side.) The object of making this case G whole, in one piece of metal, and of making it open only from one side, is believed will be clearly seen and understood by a person skilled in the art. It saves labor in putting the parts together; it secures uniformity of shape and appearance; it greatly facilitates in the manufacture. The forming of the axis-pin *a* in the centre of the wheel-case, and of the same piece of metal therewith, affords particular advantage in the mechanical work of manufacturing the articles, because it forms a hub, upon which the tool turns in milling out the chamber of the case. Also, because every depression of the stamp brings the whole pressure upon said axis-pin, so that if it were secured in the case by riveting, or by a screw, it would be liable, in a very short time, to work loose and get out of working order. H is a bracket, made on or secured to the back side of the case G. This bracket is provided with a step, *c*. This step enters a socket, *d*, formed in the lower end of the spindle E, and serves to hold the centre of the case firmly to the spindle. The upper end of this bracket extends upward sufficiently above the upper edge of the case to allow of an orifice, through which the screw *e* may be turned into the spindle, thus firmly holding the upper end or edge to the spindle. Thus, by inserting the step *c* into the lower end of the spindle, and turning the screw *e* through the upper end of the bracket H into the spindle E, the whole case is firmly secured thereto, and, by simply turning out said screw, it is easily and quickly detached therefrom. This bracket is also fitted to work closely and freely between the edges of the slitted guide-way, formed in the bearing or projection D′, which serves to keep the face of the case G at right angles with the stock A. I and J are wheels, which rotate upon an axis-pin formed in the centre of the case G. These wheels are provided with characters, secured upon the edges thereof; each wheel moving or rotating independently of the other, and so arranged, inside of said case, that any period of time can be quickly brought into position to be impressed upon paper, or other article or material, placed upon the bed C, directly under the edges of said wheels, upon which said letters or characters are formed. The periphery of the wheel J is divided into twelve parts, each of which parts designates, by characters formed thereon, twelve divisions of time, or the months of the year. This wheel J is fitted to the axis-pin *a*, so as to fit closely and turn freely thereon. This wheel is also provided with twelve stops or depressions, to receive a detent or spring-catch, *q*, or its equivalent, for holding said wheel in its desired position. Said wheel is also provided with a hub, *a′*, by means of which it (the wheel J) is secured closely, and turns freely upon the axis-pin *a*. The outside of the hub *a′* forms an axis, upon which the hub of the wheel I is fitted. It also extends forward through the cap P, and is provided with a bearing to receive the eye of the calendar-wheel R, and a slit to receive the key formed in said eye. The periphery of the wheel I is divided into thirty-one parts, each part having characters formed thereon to represent a given period of time, or the days of a month. It is also provided with stops or depressions (thirty-one) for receiving a detent or spring, *q'*, the object of which is to hold the wheel I, by the action of a detent, in a fixed or desired position, and allow of its being moved forward to any other position by depressing said detent from the depressions. This wheel I is fitted on to the hub of the wheel J, so as to turn closely and freely thereon, and close to the side of the wheel J. The hub of this wheel extends through the front plate or cap P, and is provided with a bearing and slit to receive the eye and key of the calendar-wheel R'. These wheels may be used, one, two, or more, in number, as may be desirable, each wheel being fitted successively, one upon the hub of the other, each having its hub project forward through the cap-plate P sufficient to receive a like number of calendar-dials R. P is a cap or plate, fitted to and closes up the front of the wheel-case. The detents or springs *q q'*, or their equivalents, are fitted to the case or cap P, so as to fit into one of the depressions or notches formed on the wheels; so that, by simply pressing the detents or springs, the wheels will be free, one or more at a time, to be turned to any other fixed or desired point. R is a calendar-wheel, the eye of which is provided with a key-formation, which enters the slit formed in the hub of the wheel J. This calendar-wheel is provided with figures or characters on the face thereof, which represent the months of the year. This wheel is also so arranged upon the hub of the wheel J that when the character which represents January is in a perpendicular centre line at the top of the wheel, the character which represents January on the periphery of the wheel J will be directly under a centre line of said wheel J. These calendar-wheels are provided with protuberances *i i'*, the use of which is to turn the wheels from one point to another. R' is a calendar-wheel, the eye of which is provided with a key-formation, which enters the slit formed in the hub of the wheel I, which serves to hold said wheel in a fixed relative position with the said wheel. This calendar-wheel is provided with figures or characters on the face thereof, which represent the days of the months. This calendar-wheel is so arranged upon the hub of the wheel I that when the character which represents one day of the month is in a perpendicular centre line at the top of the wheel, the character, on the periphery of the wheel I, that represents the same day, will be directly under and in a perpendicular line of said wheel. These wheels I, J, R, and R', are secured upon the hub or axis-pin *a* by means of a screw, *k*, or its equivalent. T is a pointer-indicator or mark, arranged at the top of the wheel-case, and on a perpendicular centre line thereof, the object of which is to indicate the position of the characters on the periphery of the wheels I, J, which it is desirable to impress upon paper placed upon the bed C. Now, if figure 1 on the calendar-wheel R' be placed directly under the indicator T, the same type or figure 1 on the periphery of the wheel I will present itself directly over the bed C, and, when depressed upon paper on the bed, will produce figure 1 thereon. Also, if "Jan." on the calendar-wheel R be placed directly under the indicator T, the same character on the wheel J will present itself over, and produce, when pressed down upon the bed C, "Jan." on paper placed on the bed C. At the same time, by casting the eye upon the characters on the calendar-wheels, directly under the indicator T, the month, and day of the month, will be clearly seen, and always corresponding with the month and day of the month produced by the stamp upon paper, thus serving the double purpose of a counting-room calendar and a hand-stamp. The ribbon, which produces color upon paper by the pressure of the stamp, is arranged and operated much in the common way. L is a chase for holding the type for printing other matter in connection with the date. This chase is provided with a flanch, K, and is secured in its proper place by a screw, *n*, (designed to be a thumb-screw.) The importance of this flanch, in connection with the wheel-type, is very great, because, without the use of the flanch, it would be necessary, in order to secure it in place, to insert screws up through the chase into the under side of the wheel-case, and these screws cannot be turned in or out without first removing the wheel-case. The screw *n*, when made in the form of a thumb-screw, can be easily and quickly removed and replaced, thus securing and releasing said chase, when desirable, in a quick and easy manner, and thereby greatly adding to the value and utility of the machine.

These stamps may be made with one, two, or more, wheels inside of the case, as may be desirable, upon the same principle of construction as herein described.

I do not claim a device for printing numbers as shown by a patent to Joseph Pollak, July 4, 1865.

I have thus endeavored to show the nature, construction, and advantage of this invention, so as to enable others skilled to make and use the same therefrom.

What I claim, therefore, and desire to secure by Letters Patent, is—

1. The employment of an indicator-index or calendar, R R', to represent the period of time, in combination with stamp-cancelling wheels I J, arranged and operating substantially as described.

2. I claim the wheel-case G, stud or axis-pin *a*, with the ribbon-cylinder when made in one piece of metal, substantially as and for the purpose described.

3. I claim the calendar-wheels R R', arranged upon the same axle with the wheels I J, in combination with a hand-stamp, arranged and operating substantially as described.

4. I claim the bracket H, made on or secured to the case G, having a step, *c*, or its equivalent, to enter the lower end of the spindle, and orifice for the screw *e*, for attaching and detaching said case to the spindle E, substantially as and for the purpose described.

5. I claim, in a hand-stamp, the employment of the flanch K on the chase L, in combination with the case G and bed C, for the purpose of easily and quickly attaching and detaching said chase on or off of said case.

B. B. HILL. [L. S.]

Witnesses:

N. C. WILDER,

JEREMY W. BLISS.